US006862715B2

(12) United States Patent
Burden et al.

(10) Patent No.: US 6,862,715 B2
(45) Date of Patent: Mar. 1, 2005

(54) SYSTEMS AND METHODS OF CROSS-OVER CURRENT CALCULATION WITHIN ELECTRONIC DESIGNS

(75) Inventors: David C. Burden, Fort Collins, CO (US); Matthew Biggi, Fort Collins, CO (US); Jaime Weisberg, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 155 days.

(21) Appl. No.: 10/207,578

(22) Filed: Jul. 29, 2002

(65) Prior Publication Data

US 2004/0019858 A1 Jan. 29, 2004

(51) Int. Cl.[7] .............................................. G06F 17/50
(52) U.S. Cl. .......................................................... 716/2
(58) Field of Search .................................. 716/1, 2, 4

(56) References Cited

U.S. PATENT DOCUMENTS

2003/0177452 A1 * 9/2003 Chen .............................. 716/2
2003/0177460 A1 * 9/2003 Chen .............................. 716/5

* cited by examiner

Primary Examiner—Stacy A. Whitmore

(57) ABSTRACT

A process is shown for determining crossover current in a circuit design. One or more static CMOS gates are identified within the circuit design. One or more widths of at least one of a P-stack and N-stack associated with the CMOS gates are then determined. A voltage slope at the input of, and a capacitive load at the output of, one or more of the nodes are also determined. Crossover current, per static CMOS gate, is estimated based on the widths, the voltage slope and capacitive load. An overall crossover current is determined by summing individual gate-level crossover currents. The circuit design may be optimized for power consumption, for example, by modifying design elements of the circuit design while monitoring overall crossover current.

3 Claims, 3 Drawing Sheets

SYSTEMS AND METHODS OF CROSS-OVER CURRENT CALCULATION WITHIN ELECTRONIC DESIGNS

BACKGROUND OF THE INVENTION

The prior art is familiar with computer aided design (CAD) software to create, verify and analyze electronic designs, including designs for microprocessor and digital signal processor (DSP) chips. Such software for example provides for system level design, verification, analysis and simulated testing of register-transfer logic (RTL), gates and physical layout structures. In one example, certain CAD software may further perform transistor-level timing analyses of electronic designs.

Power efficiency within the electronic design is important because, among other reasons, power may often be traded for increased performance. With the increasing complexity of electronic designs—often exceeding one billion components—optimizing power consumption within the circuit design is thus increasingly difficult. Power consumption within the electronic design may derive from several sources, including dynamic switching power of capacitors, DC currents including leakage from diodes, and crossover currents in static complimentary metal oxide semiconductor (CMOS) logic using field effect transistors (FETs), such as metaloxide silicon field effect transistors (MOSFETs). As used hereinafter, a FET and a MOSFET are each denoted as a FET.

Modern circuit designs have seen a decrease in dynamic power consumption; static power consumption analysis and optimization of the electronic design has thus become increasingly important. Accordingly, crossover current within inverters incorporating CMOS FETs has increasing relevance to power consumption within modern circuit designs. At the same time, software such as SPICE has a very long run time.

SUMMARY OF THE INVENTION

An electronic design typically includes a plurality of linked design elements defining components such as wires, capacitors, FETs, inverters, diodes and other devices such as operational amplifiers. If analyzed, these linked design elements define various forms of power consumption within the design, including dynamic CMOS switching power consumption, leakage currents from diodes, and dynamic and static crossover currents through the gates of inverters. The invention of one aspect seeks to identify one or more static CMOS gates within the electronic design. The static CMOS gates are typically part of design elements defining FET components of the design. Once identified, these gates are processed to determine an effective width of N-type semiconductor material (hereinafter a N-stack) and/or P-type semiconductor material (hereinafter a P-stack) associated with the gate. The voltage slope ($V_S$) at the input of, and capacitive load ($C_L$) at the output of, each node of the electronic design is also determined. The effective widths of the N-stack and P-stack are processed with $V_S$ and $C_L$ to determine a crossover current of each of the static CMOS gates. The crossover current of each of the gates is then summed to generate an overall crossover current for the electronic design.

Identifying static CMOS gates may be assisted by use of CAD software such as DYNAMODEL by Circuit Symantics, Inc., as known to those skilled in the art. Determining $V_S$ and $C_L$ may also be assisted by use of CAD software such as PATHMILL, by Synopsis, as known to those skilled in the art.

The electronic design may then be optimized to reduce its power consumption by implementing modifications to the design elements of the electronic design. By way of example, a threshold voltage of the design may be lowered to increase leakage current while decreasing crossover current. In another example, a high power FET design element may be added to the design to reduce overall power and increase overall crossover current.

More particularly, and in one aspect, a wide, high-threshold voltage FET may be replaced with a thin, low-threshold FET; this increases the leakage current of the FET and increases the power consumption of the electronic design, yet maintains the performance characteristics of the electronic design. At the same time, the thin FET presents a lesser capacitive load to the FETs driving it; these driving FETs may thus be replaced with thinner FETs to facilitate faster switching and less leakage. The overall power consumption of the electronic design is thus reduced, as decreased leakage current in the driving FETs may be greater than the increased leakage current in the low-threshold FET. Moreover, the driving FETs now see a lower capacitive load, since the new low-threshold FET is thinner than it's predecessor; this lower load will result in less dynamic (switching) power consumed by the electronic design.

In another aspect, the electronic design is further optimized to reduce circuit noise by reducing crossover current.

Certain advantages of the invention are realized in accord with the above-described aspects. By way of example, electronic design circuits may now be analyzed with improved accuracy in determining circuit power consumption. Further, optimization of the circuit via CAD software may practically target major sources of crossover current; static CMOS gates are also easier to modify, without design setback, than other types of gates within the design. In another example, the invention provides for separating static CMOS crossover current from other types of power consumption, including dynamic crossover currents and switching capacitors. These and other advantages are apparent within the description that follows.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF THE DRAWINGS

Figure 1:
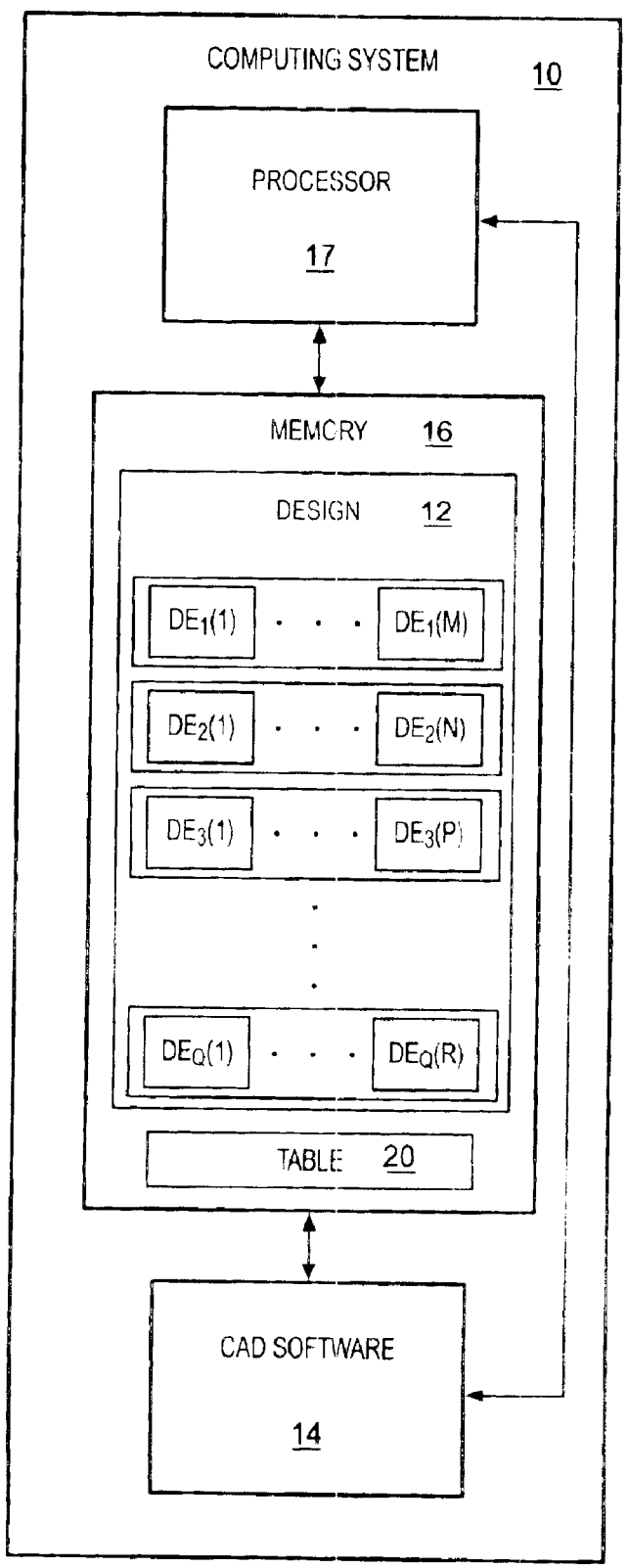
FIG. 1 shows one system of the invention for determining crossover currents of an electronic design.

FIG. 1 shows a computing system 10 for determining crossover currents of an electronic design 12 in accord with one embodiment of the invention. Design 12 may be further analyzed and optimized by CAD software 14. Design 12 and software 14 may be resident and/or loaded within local computer memory 16 of system 10. A processor 17 generally processes software 14 to decode, analyze and/or optimize design 12 in accord with the teachings herein. Design 12 includes a plurality of design elements (DE). Design elements DE may include one or more FETs, wires, capacitors, diodes, operational amplifiers, resistors, logic gates and other design components.

Processor 17 is configured to determine one or more static CMOS gates associated with design elements DE of design 12. By way of example, processor 17 may segregate design elements DE into dynamic design elements and static design elements. Dynamic design elements may for example include switching capacitors and diodes. Design elements $DE_1(1) \ldots DE_1(M)$ may illustratively represent such dynamic design elements; design elements $DE_2(1) \ldots DE_2(N)$ may illustratively represent such static design elements. Design elements $DE_3(1) \ldots DE_3(P)$ may for example represent wires and design elements $DE_Q(1) \ldots DE_Q(R)$ may represent other components and devices (e.g., operational amplifiers) of design 12. Integers M, N, P, R may be same or different integers and may denote a small or large plurality of design elements DE within design 12. Design elements DE link together to form the functionally operable circuit of design 12.

Processor 17 may utilize CAD software 14 that includes a program such as DYNAMODEL, by Circuit Symantics, Inc., as known to those skilled in the art, to determine static CMOS gates of design 12.

Processor 17 is further configured to determine a width of each N-stack and/or each P-stack associated with each identified static CMOS gate. The steps associated with determining the width is described further in connection with FIG. 2.

Processor 17 is further configured to identify and determine $V_S$ at the input of each node in circuit 12 and $C_L$ at the output of each node of design 12. Processor 17 may utilize CAD software 14 that includes a program such as PATHMILL, by Synopsis, as known to those skilled in the art, to determine $V_S$ and $C_L$ at the nodes of design 12.

Figure 2:
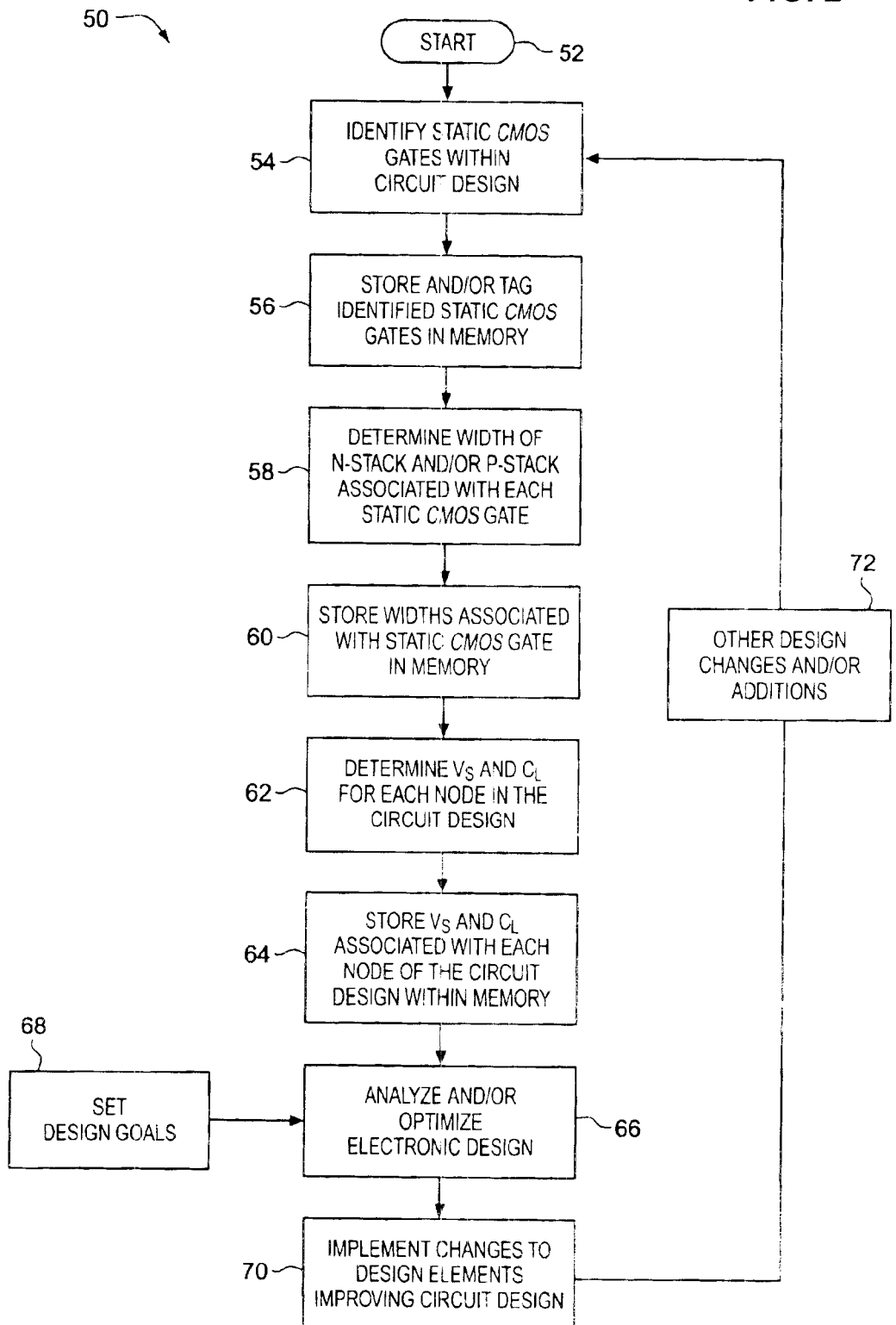
FIG. 2 shows a flowchart illustrating one method for determining crossover currents of an electronic design in accord with one method of the invention.

Processor 17 then computes a crossover current per static CMOS gate by combining the width of the N-stack and/or P-stack with $V_S$ and $C_L$, for example in accordance with the method of FIG. 2. Processor then sums crossover currents from all static CMOS gates to determine an overall crossover current for design 12.

Processor 17 may store data such as identified static CMOS gates, $V_S$ and $C_L$ values per node, and crossover currents per static CMOS gate within internal memory, such as within table 20. These data may include vectors and/or data structures linking each entry to appropriate design elements and gates of design 12.

FIG. 2 shows a flowchart 50 illustrating one method for determining crossover currents of an electronic design, in accord with one method of the invention. The electronic design (e.g., design 12, FIG. 1) is identified or selected at start 52; the electronic design includes one or more design elements (e.g., design elements DE, FIG. 1) with at least one static CMOS gate. Static CMOS gates of the design are identified in step 54. By way of example, step 54 may include recognizing design elements within the design via DYNAMODEL by Circuit Symantics, Inc. These identified static CMOS gates within the design may be tagged with an identifier and/or stored within memory (e.g., within table 20, FIG. 1), in step 56.

The width of the N-stack and/or P-stack associated with each identified static CMOS gate is determined in step 58; this width may be an actual width as determined, for example, by CAD software, or an estimated width. In one embodiment, step 58 includes estimating the width by summing the width of each FET in a set of parallel FETs. In another embodiment, step 58 includes estimating the width by combining the widths of two FETs in series by dividing one by a sum of (a) one divided by the width of the first serial FET and (b) one divided by the width of the second serial FET. In still another embodiment, step 58 may include estimating the width by similar combinations of previously estimated FET widths until only a single FET remains, at which point its effective width is used as a result of step 58. The width(s) of the N-stack and/or P-stack may be stored within memory (e.g., within table 20, FIG. 1), in step 60.

$V_S$ and $C_L$ are determined for each node of the circuit design in step 62. By way of example, step 62 may include utilizing a timing engine such as PATHMILL by Synopsis to isolate occurrences of each node and to calculate values of $V_S$ and $C_L$. The values of $V_S$ and $C_L$ may be stored within memory (e.g., within table 20, FIG. 1), in step 64.

Those skilled in the art should appreciate that steps 54–64 are shown for illustrative purposes and that certain changes or step sequences may be altered as a matter of design choice. For example, step 62 and its associated steps may precede step 54 and its associated steps; similarly, steps 58 and 64 may be reversed.

The circuit design is analyzed and/or optimized in step 66. In one example, step 66 may involve modifying one or more of the design elements of the circuit design and then reanalyzing the circuit design relative to certain design goals. In another example, additional design elements may be added to the design. One design goal may include lower power consumption for the electronic design; another design goal may be to reduce circuit noise. Design goals may be set for use in processing 66 the circuit design as indicated by step 68.

If optimizations to certain design elements are shown to improve the design—such as if the design utilizes less power—then such design elements associated are modified in accordance with the optimizations, in step 70. The process of steps 54–70 may then repeat, as desired, particularly when other design changes and/or additions are made to the overall electronic design such as in step 72.

Figure 3:
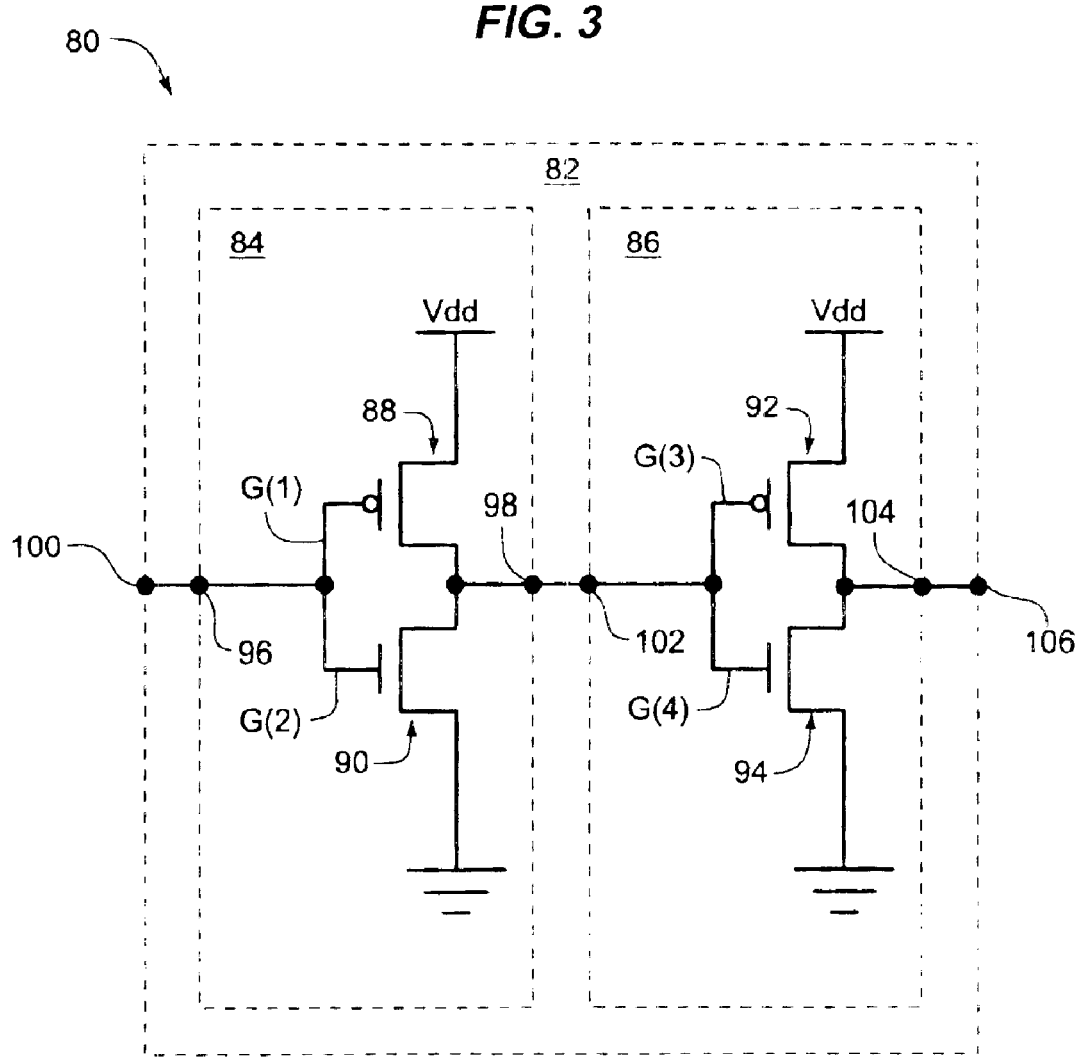
FIG. 3 shows one exemplary design having a plurality of FETs and static CMOS gates identified and processed in accord with the method of FIG. 2.

FIG. 3 shows one illustrative design 80 (e.g., design 12, FIG. 1) with a static CMOS gate as used herein. Design 80 includes a block 82, which may be considered a block with hierarchy of design 80. Block 82 includes block 84 and block 86. Block 84 and 86 may be hierarchically linked to block 82. Block 84 includes FETs 88 and 90 (i.e., design elements 88 and 90). Block 86 includes FETs 92 and 94 (i.e., design elements 92 and 94).

P-type FET 88 has a gate G(1) connected to input node 96 of block 84, a source terminal connected to a first power supply, and a drain terminal connected to output node 98 of block 84. N-type FET 90 has a gate G(2) connected to gate G(1) of P-type FET 88, a source terminal connected to a second power supply, and a drain terminal connected to the drain terminal of P-type FET 88. FET's 88 and 90 are configured to perform a function of an inverter, thus block 84 may function as a first inverter block. Input node 96 of block 84 is connected to input node 100 of block 82. A signal from input node 100 of block 82 may be ported to input node 96 of block 84. Output node 98 of block 84 is connected to input node 102 of block 86. The signal of block 84 may be ported from output node 98 to input node 102 of block 86.

P-type FET 92 has a gate G(3) connected to input node 102 of block 86, a source terminal connected to a first power supply, and a drain terminal connected to output node 104 of block 86. N-type FET 94 has a gate G(4) connected to gate G(3) of P-type FET 92, a source terminal connected to a second power supply, and a drain terminal connected to the drain terminal of P-type FET 92. FET's 92 and 94 are configured to perform a function of an inverter, thus block 86 may function as a second inverter block. Output node 104 of block 86 is connected to output node 106 of block 82. The signal of block 86 may be ported from output node 104 of block 86 to output node 106 of block 82.

For illustrative purposes, each FET 88, 90, 92, 94 is a static-type FET. Processor 17 of FIG. 1 may thus utilize the method of flowchart 50 to identify static CMOS gates G(1)–G(4) and process circuit design 12 as described above. Processor 17 may then further operate to identify each of nodes 100, 96, 98, 102, 104 and 106, to calculate $V_S$ and $C_L$. Processor 17 may also calculate the effective widths of FETs 88, 90, 92, 94 as follows: FETs 88, 90 and FETs 92, 94 may be summed, respectively, to generate two effective FET width values (value 1, value 2); these values may then be combined as a serial combination ((value 1–value 2)/(value 1+value 2)) to determine an overall width for design 80. Finally, processor 17 determines the crossover current for each gate G(1)–G(4) and sums individual crossover currents for an overall crossover current of design 80. Individual crossover current, per gate G, may be calculated as (Pwidth*Nwidth)/( Pwidth+Nwidth)*$(K_1*V_S-K_2*C_L)$, for example, where Pwidth is a width of a P-stack gate, Nwidth is a width of a N-stack gate, and where $K_1$, and $K_2$ include one or more manufacturing constants.

In one embodiment, the calculation to determine the effective width of a Pstack and/or Nstack CMOS gate is as follows:

1. Select two FETs that are either in a parallel or serial configuration within the P-stack or N-stack; the widths of these two FETs are, respectively, a and b.
2. If the two FETs are parallel, remove them both and replace them with a single FET with a width "c" equaling the sum of the widths of the two FETs, i.e., c=a+b.
3. If the two FETs are serial, remove them both and replace them with a single FET with a width "c" equaling the inverse of the sum of the inverses of the widths of the two FETs, i.e., c=1/((1/a)+(1/b)).
4. Additional FETs may be similarly combined in the calculation of effective width by combining these additional FETs with the single FETs of steps 1–3, and then repeating steps 1–4; this may repeat until only a single FET remains with an overall effective width.

Since certain changes may be made in the above methods and systems without departing from the scope of the invention, it is intended that all matter contained in the above description or shown in the accompanying drawing be interpreted as illustrative and not in a limiting sense. It is also to be understood that the following claims are to cover all generic and specific features of the invention described herein, and all statements of the scope of the invention which, as a matter of language, might be said to fall there between.

What is claimed is:

1. A process for determining crossover current in a circuit design, comprising the steps of:
    determining one or more static CMOS gates of the circuit design;
    determining one or more widths of at least one of a P-stack and N-stack associated with the CMOS gates;
    determining voltage slope ($V_S$) and capacitive load ($C_L$) for at least one node of the circuit design; and
    determining crossover current for the CMOS gates by calculating (Pwidth*Nwidth)/( Pwidth+Nwidth)*$(K1*V_S-K2*C_L)$, wherein Pwidth is a width of the P-stack gate, Nwidth is a width of the N-stack gate, and where K1 and K2 include one or more manufacturing constants.

2. A method for determining an effective width of multiple FETs in a circuit design, comprising the steps of:
    selecting first and second FETs in a parallel or serial configuration within the design, the first FET having a first width, the second FET having a second width;
    if the two FETs are in a parallel configuration, replacing the two FETs with a single FET having an effective width equaling the sum of the first and second widths;
    if the two FETs are in a serial configuration, replacing the two FETs with a single FET having an effective width equaling one divided by a sum of (a) one divided by the first width and (b) one divided by the second width; and
    combining at least a third FET to the single FET, including replacing the third FET and the single FET with another single FET having an effective width determined according to one of the steps of replacing and depending upon whether the third FET and the single FET are in a parallel or serial configuration.

3. A method for reducing cross-over current consumption in an electronic circuit design, comprising:
    determining static CMOS gates within the circuit design, including separating dynamic design elements from static design elements;
    determining effective width of each N-stack and each P-stack associated with the gates;
    processing the effective widths with (a) a voltage slope (Vs) at the input of and (b) a capacitive load (CL) at the output of each node of the gates to determine crossover current for at least part of the electronic design; and
    determining the crossover current for the gates by calculating (Pwidth*Nwidth)/(Pwidth+Nwidth)*$(K1*V_S-K2*C_L)$, wherein Pwidth is a width of the P-stack, Nwidth is a width of the N-stack, and where K1 and K2 include one or more manufacturing constants.

* * * * *